(12) United States Patent
Shukla et al.

(10) Patent No.: US 10,506,334 B1
(45) Date of Patent: Dec. 10, 2019

(54) AUDIO ENHANCEMENTS IN MOTOR-DRIVEN DEVICES

(71) Applicant: GoPro, Inc., San Mateo, CA (US)

(72) Inventors: Himay Shukla, San Mateo, CA (US); Erich Tisch, San Francisco, CA (US); Joyce Gorny, Mountain View, CA (US); Eric Penrod, Brentwood, CA (US); Kielan Crow, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/288,420

(22) Filed: Feb. 28, 2019

Related U.S. Application Data

(63) Continuation of application No. 16/106,553, filed on Aug. 21, 2018.

(51) Int. Cl.
 *H04R 1/16* (2006.01)
 *H04R 1/28* (2006.01)
 (Continued)

(52) U.S. Cl.
 CPC ........... *H04R 1/2876* (2013.01); *H02K 7/003* (2013.01); *H04R 1/08* (2013.01); *H02K 7/08* (2013.01); *H04N 5/2328* (2013.01)

(58) Field of Classification Search
 CPC ............ H02R 2410/03; H02R 2410/05; H02R 2410/07; H04R 1/28; H04R 1/222;
 (Continued)

(56) References Cited

U.S. PATENT DOCUMENTS 3,692,264 A * 9/1972 Burkhard ................ F16F 1/424
 206/583
3,732,446 A * 5/1973 Bryant .................. B06B 1/0648
 310/324
(Continued)

FOREIGN PATENT DOCUMENTS

EP 0757115 2/1997

OTHER PUBLICATIONS

"Microphone Suspension and Noise Shield" IBM Technical Disclosure Bulletin, V.14, Is.6, pp. 1781-1782, Nov. 1971 (Year: 1971).*

(Continued)

*Primary Examiner* — Burton S Mullins
(74) *Attorney, Agent, or Firm* — Young Basile Hanlon & MacFarlane, P.C.

(57) ABSTRACT

An image capture device and a handheld image stabilization device may each include a housing, a motor assembly, a microphone, a dampener, or any combination thereof. The housing may include a first port. The motor assembly may be attached to the housing. The motor assembly may include a plurality of motors. The microphone may be configured to detect audio waves via the first port, vibration noise of the plurality of motors via the housing, or both. The audio waves may include acoustic noise from the plurality of motors. The dampener may be coupled to the housing. The dampener may be configured to reduce the acoustic noise from the plurality of motors, the vibration noise from the plurality of motors, or both.

17 Claims, 7 Drawing Sheets

(51) Int. Cl.
  *H02K 7/00* (2006.01)
  *H04R 1/08* (2006.01)
  *H02K 7/08* (2006.01)
  *H04N 5/232* (2006.01)

(58) Field of Classification Search
  CPC .. H04R 1/2807; H04R 1/2869; H04R 1/2876; H04R 1/2892; H04R 2410/00; H04R 2499/11; H04N 5/2328; H04N 5/23264
  USPC .......................... 310/51, 354, 361, 368–369
  See application file for complete search history.

(56) References Cited

U.S. PATENT DOCUMENTS

| | | | |
|---|---|---|---|
| 3,947,646 A * | 3/1976 | Saito | H04R 1/08 |
| | | | 381/368 |
| 4,199,667 A * | 4/1980 | Renner | H04R 1/08 |
| | | | 381/355 |
| 4,217,508 A | 8/1980 | Uzuka | |
| 4,232,205 A * | 11/1980 | Ribeyre | G11B 33/123 |
| | | | 381/162 |
| 4,296,341 A | 10/1981 | Guettinger | |
| 4,434,329 A * | 2/1984 | Nasu | H04R 1/222 |
| | | | 381/354 |
| 4,453,045 A * | 6/1984 | Bruna | H04R 1/08 |
| | | | 381/354 |
| 4,453,046 A * | 6/1984 | Fidi | H04R 1/08 |
| | | | 381/355 |
| 4,742,256 A | 5/1988 | Tanaka | |
| 5,031,872 A * | 7/1991 | Vance | F16F 9/0481 |
| | | | 248/187.1 |
| 5,497,040 A | 3/1996 | Sato | |
| 5,625,511 A | 4/1997 | Brooks | |
| 6,097,115 A | 8/2000 | Tevaarwerk | |
| 7,190,802 B2 * | 3/2007 | Rains | H04R 1/083 |
| | | | 381/355 |
| 8,013,481 B2 | 9/2011 | Sommerlatte | |
| 8,938,160 B2 * | 1/2015 | Wang | F16M 11/10 |
| | | | 396/13 |
| 8,985,068 B2 | 3/2015 | Nicgorski | |
| 8,989,428 B2 * | 3/2015 | Hill | H04R 1/06 |
| | | | 381/386 |
| 9,489,937 B1 * | 11/2016 | Beard | G10K 11/178 |
| 9,871,901 B2 * | 1/2018 | Hiramatsu | H04R 1/2892 |
| 2002/0046901 A1 * | 4/2002 | Zapfe | F16F 7/104 |
| | | | 181/206 |
| 2007/0165897 A1 * | 7/2007 | Ishibashi | H04R 1/083 |
| | | | 381/365 |
| 2016/0352992 A1 * | 12/2016 | Saika | H04N 5/2328 |
| 2017/0198747 A1 * | 7/2017 | Chen | B64D 47/08 |

OTHER PUBLICATIONS

R.Blevins "Formulas for Dynamics, Acoustics and Vibration", pp. 374-391, 2016. (Year: 2016).*
"17. Shaft Design Introduction" Aug. 15, 2007 https://uni.edu/-rao/Md-17%20Shaft%20Design.pdf (Year: 2007).
Duncan N. Walker. Torsional Vibration of Turbo-Machinery. Machine Torsional Vibration Design Rules, Chapter (McGraw-Hill, 2004). Chap.11. (Year: 2004).
S. Loewenthal, "Design of Power-Transmitting Shafts" Nasa Reference Publication 1123, Jul. 1984 (Year: 1984).

* cited by examiner

AUDIO ENHANCEMENTS IN MOTOR-DRIVEN DEVICES

CROSS REFERENCE TO RELATED APPLICATIONS

This application is a continuation of U.S. patent application Ser. No. 16/106,553, filed on Aug. 21, 2018, the contents of which are incorporated by reference herein in their entirety.

TECHNICAL FIELD

This disclosure relates to audio enhancements in motor-driven devices.

BACKGROUND

Stabilization mechanisms for use with image capture devices have a physical limitation with respect to structural vibration conduction noise, acoustic noise, or a combination thereof, resulting in poor audio quality during image capture. Typical stabilization mechanisms are configured with motors that have solid shafts. A solid shaft, when energized, vibrates at a natural resonance causing undesirable noise from wind displacement pressure and noise from the conduction of the vibration. The noise from the wind displacement pressure may be referred to as acoustic noise. The noise from the conduction of the vibration may be referred to as structural noise. In particular, the acoustic noise occurs when the natural resonance of the solid shaft overlaps with the operating frequency of the motor.

SUMMARY

Disclosed herein are implementations of improved motor design and microphone design that reduce the structural vibration conduction noise, acoustic noise of the stabilization mechanism, or both.

In one aspect, a handheld image stabilization device may include a housing, a motor assembly, a microphone, a dampener, or any combination thereof. The housing may include a first port. The motor assembly may be attached to the housing. The motor assembly may include a plurality of motors. The microphone may be configured to detect audio waves via the first port. The audio waves may include acoustic noise from the plurality of motors. The dampener may be disposed between the housing and the microphone. The dampener may be configured to reduce the acoustic noise from the plurality of motors.

In another aspect, a handheld image stabilization device may include a housing, a motor assembly, a microphone, a dampener, or any combination thereof. The housing may include a first port. The motor assembly may be attached to the housing. The motor assembly may include a plurality of motors. The microphone may be configured to detect vibration noise from the plurality of motors via the housing. The dampener may be disposed between the housing and the microphone. The dampener may be configured to reduce the vibration noise from the plurality of motors.

In another aspect, an image capture device may include an image sensor, an image stabilization device, a microphone, a dampener, or any combination thereof. The image stabilization device may be coupled to the image sensor. The image stabilization device may include a motor assembly. The motor assembly may include a plurality of motors. The microphone may be configured to detect audio waves. The audio waves may include acoustic noise from the plurality of motors. The dampener may be configured to reduce the acoustic noise from the plurality of motors. The microphone may be configured to detect vibration noise from the plurality of motors. In some embodiments, the dampener may be configured to reduce vibration noise from the plurality of motors in addition to or in place of reducing acoustic noise.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Stabilization mechanisms for use with image capture devices have a physical limitation with respect to structural vibration conduction noise, acoustic noise, or a combination thereof, resulting in poor audio quality during image capture. This disclosure describes improved motor design and microphone design that reduce the structural vibration conduction noise and acoustic noise of the stabilization mechanism.

The embodiments disclosed herein will now be described in detail with reference to the drawings that are provided as illustrative examples to enable those skilled in the art to practice the technology. The figures and examples below are not meant to limit the scope of the present disclosure to a single implementation or embodiment, but other implementations and embodiments are possible by way of interchange of or combination with some or all of the described or illustrated elements. Wherever convenient, the same reference numbers will be used throughout the drawings to refer to same or like parts.

Figure 1A:
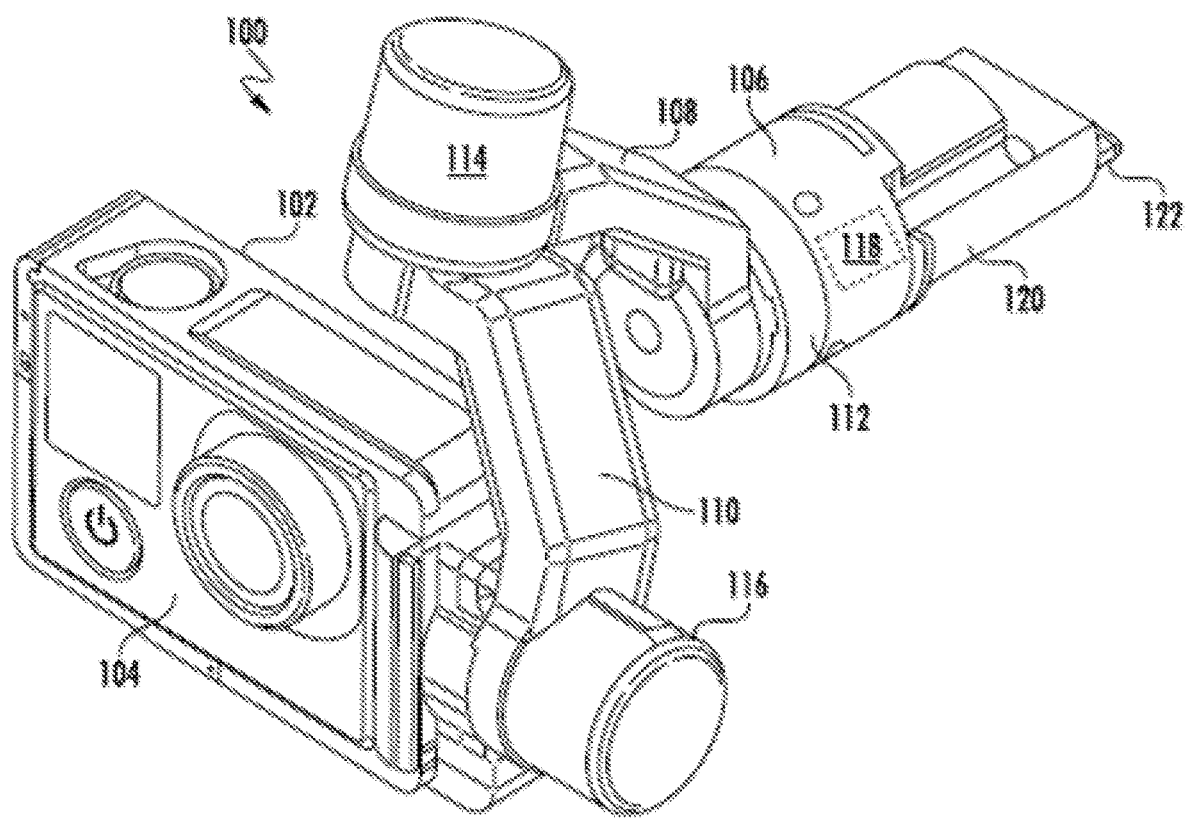
FIG. 1A is a diagram of an example of a three-axis image stabilization mechanism.

FIG. 1A shows an example of a three-axis image stabilization mechanism. In this example, the three-axis stabilization mechanism is a gimbal 100. A frame 102 that secures an imaging device 104 is removably coupled to the gimbal 100. The gimbal 100 includes three arms, a first arm 106, a second arm 108, and a third arm 110. The gimbal 100 also includes three motors, a first motor 112, a second motor 114, and a third motor 116, each associated with one or more of the arms 106, 108, 110, for example, at junctures between the arms 106, 108, 110. Each of the motors 112, 114, 116 may include one or more encoders (not shown) that detect axial rotation.

In the example of FIG. 1A, the first motor 112 is integral with the first arm 106. A first end of the second arm 108 is connected to the first arm 106 and the first motor 112. A second end of the second arm 108 is connected to the second motor 114 and a first end of the third arm 110. A second end of the third arm 110 is connected to the third motor 116 and the removable frame 102 securing the imaging device 104. The sequential connections of arms 106, 108, 110 and motors 112, 114, 116 allows for three-axis rotation and control of a mounted object, such as the imaging device 104, in space.

The gimbal 100 operates to maintain the imaging device 104 in a specified orientation. When the gimbal 100 and the imaging device 104 are attached to a platform (e.g., a UAV, a handheld grip, or another platform) that moves in space, the imaging device 104 remains generally motionless in respect to the platform. The gimbal 100 may include a control system 118, either on-board or remote, that provides commands to the motors 112, 114, 116 to maintain the specified orientation of the imaging device 104 based, for example, on information received from sensors (not shown) that indicate instantaneous values for or changes in orientation of the imaging device 104 in respect to each of three axes of rotation (e.g., pitch, roll, and yaw). The specified orientation for the imaging device 104 may be based on: user-provided inputs or settings; sensor-provided information; a presence of a horizon, a tracked object, or other features detected in an image captured by the imaging device 104; an orientation of the gimbal 100 in respect to the platform; or any combination or extension of the preceding elements.

Each of the motors 112, 114, 116 may control orientation of the imaging device 104 about a single axis (e.g., pitch, roll, or yaw), for example, when orientation of the rotational axes of the motors 112, 114, 116 is orthogonal. The axis controlled by each of the motors 112, 114, 116 may depend on the type of platform to which the gimbal 100 is attached. For example, when the gimbal 100 is attached to a UAV, the first motor 112 may rotate the imaging device 104 about a roll axis, the second motor 114 may rotate the imaging device 104 about a yaw axis, and the third motor 116 may rotate the imaging device 104 about a pitch axis. In another example, when the gimbal 100 is attached to a handheld grip, the first motor 112 may rotate the imaging device 104 about a yaw axis, the second motor 114 may rotate the imaging device 104 about a roll axis, and the third motor 116 may rotate the imaging device 104 about a pitch axis.

Some of the motors 112, 114, 116 may control orientation of the imaging device 104 about more than one of the axes (e.g., pitch, roll, and yaw), for example, when orientation of some of the rotational axes of the motors 112, 114, 116 are not orthogonal. In the gimbal 100 shown in FIG. 1A, the first motor 112 and the third motor 116 have axes of rotation that are orthogonal, and the second motor 114 and the third motor 116 have axes of rotation that are orthogonal, but the first motor 112 and second motor 114 have axes of rotation that are not orthogonal. In this example, the first motor 112 may adjust only roll, and the third motor 116 may adjust only pitch, but the second motor 114 may adjust yaw primarily, but also pitch and roll secondarily. This configuration of the gimbal 100, where some of the motors 112, 114, 116 control orientation of the imaging device 104 about more than one of the axes, can allow for a larger field of view for the imaging device 104 while reducing obstructions in the field of view.

The gimbal 100 may include an attachment arm 120 coupled to the first arm 106, the first motor 112, or both, that allows the gimbal 100 to be mounted to a platform (e.g., a UAV, a handheld grip, or any other platform). The attachment arm 120 may be selectively removable. In other examples (not shown), the attachment arm 120 may be coupled to the second arm 108, the third arm 110, the second motor 114, the third motor 116, or any combination thereof. The attachment arm 120 can include a portion of a locking mechanism (not shown) to securely attach the gimbal 100 to a complementary portion of the locking mechanism (not shown) disposed on a platform (e.g., a UAV, a handheld grip, or any other platform). The locking mechanism may include male and female components, frictional components, clamping components, or any other suitable components to achieve locked coupling of the gimbal 100 and the platform.

The gimbal 100 and/or the attachment arm 120 may include a connector 122 for the gimbal 100 to electronically couple to one or more platforms (e.g., a UAV, a handheld grip, or any other platform). The connector 122 may provide power to the gimbal 100 and/or the imaging device 104 mounted in the frame 102. The connector 122 may enable communication between the control system 118 associated with the gimbal 100 and various sensors and/or controllers (not shown) associated with the platform to which the gimbal 100 is mounted.

Though FIG. 1A shows one size and shape for the frame 102 and the imaging device 104, the gimbal 100 may be designed to work with a variety of frame and imaging device combinations. The control system 118 may use different algorithms or control parameters to control the motors 112, 114, 116 based on a mass, center of gravity, and/or moment of inertia for a particular frame and imaging device combination coupled to the gimbal 100. For example, control parameters can include allowed minimums, maximums, and/or ranges for acceleration, velocity, torque, and/or voltage for the motors 112, 114, 116 given identification of the coupled imaging device and frame.

Figure 1B:
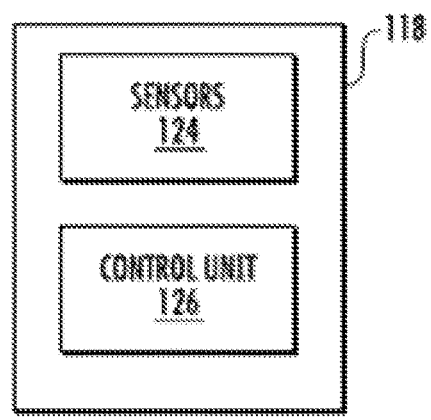
FIG. 1B is a diagram of a control system for the three-axis image stabilization mechanism of FIG. 1A.

FIG. 1B shows the control system 118 for the gimbal 100 of FIG. 1A. The control system 118 for the gimbal 100 includes one or more sensors 124 and a control unit 126. The sensors 124 may include: accelerometers, gyroscopes, and magnetometers within an inertial measurement unit (IMU) that determine rotation, orientation, and acceleration; rotary encoders that detect angular position of the motors 112, 114, 116; and a separate magnetometer to detect magnetic fields applied to the gimbal 100. Though a manufacturer may calibrate these sensors 124 upon production, inclusion of the sensors 124 in various packaging configurations and at various locations within a manufactured product such as the gimbal 100 may require additional and/or occasional calibration to account for stresses, both mechanical and thermal, that occur during manufacture, operation, and/or storage of the gimbal 100.

The control unit 126 may receive information from the various sensors 124 indicative of instantaneous orientation, angular velocity, and acceleration of various portions of the gimbal 100, such as each of the arms 106, 108, 110. The control unit 126 may use this information to apply a control algorithm that dictates angular rotation for the motors 112, 114, 116 to achieve a desired orientation for the imaging device 104 in respect to at least one of three rotational axis (e.g., pitch, roll, and yaw). The control algorithm can also account for a variety of imaging device and frame combinations of varying masses and moments of inertia. Based on the control algorithm, the control unit 126 may send commands to the motors 112, 114, 116 of the gimbal 100 to adjust the orientation of the imaging device 104.

Figure 2:
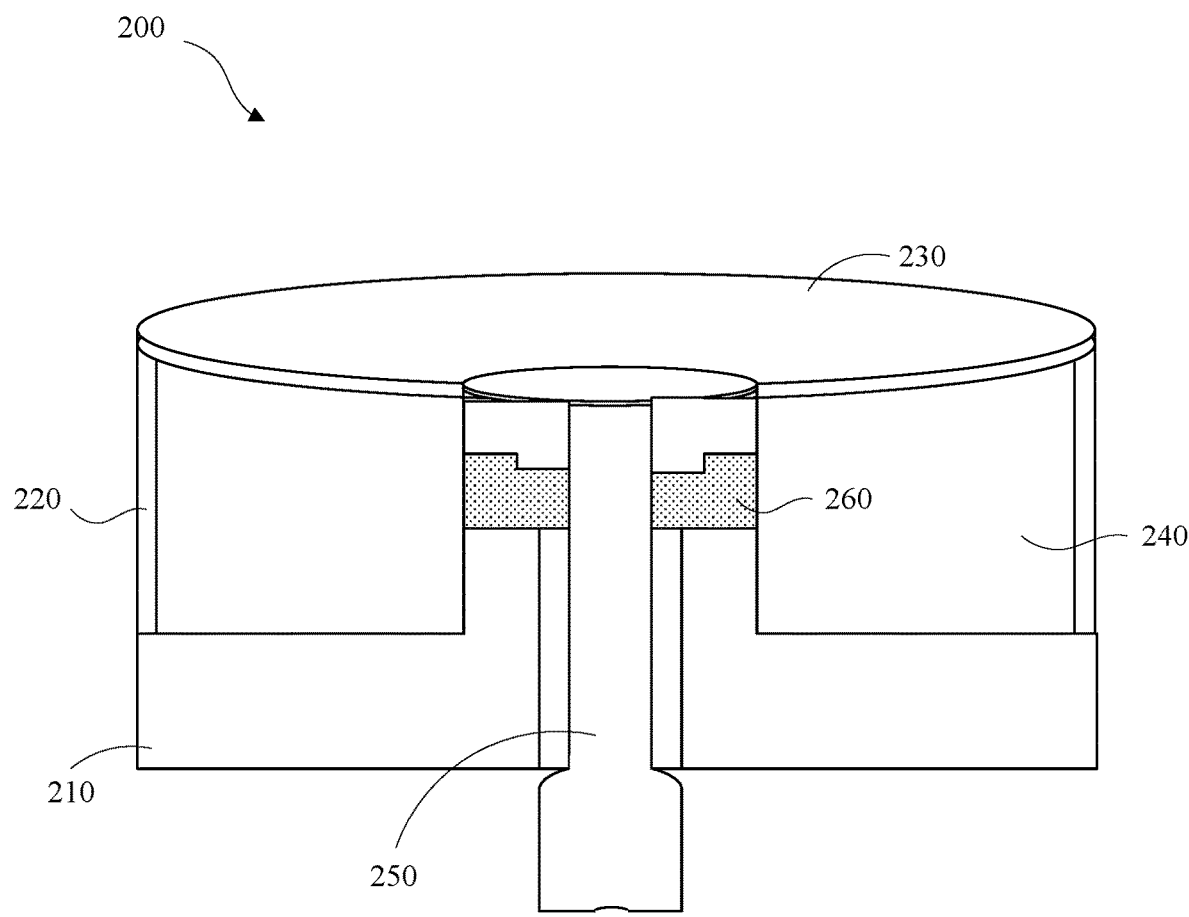
FIG. 2 is a cross-sectional diagram of a typical motor for an image stabilization mechanism.

FIG. 2 is a cross-sectional diagram of a typical motor 200 for an image stabilization mechanism. Referring to FIG. 2, the motor design 200 includes lower cage 210, an outer ring 220, and a cap 230. The lower cage 210, outer ring 220, and cap 230 form a housing that contain a coil assembly 240, a solid shaft 250, and a single bearing 260 (shown in stippling). As shown in FIG. 2, the bearing 260 is coupled to the solid shaft 250. The solid shaft 250 is configured to rotate on an axis and is driven by the coil assembly 240 and magnets attached to the outer ring 220.

The solid shaft 250, when energized, vibrates at a natural resonance causing undesirable noise from wind displacement pressure and noise from the conduction of the vibration. The noise from the wind displacement pressure may be referred to as acoustic noise. The noise from the conduction of the vibration may be referred to as structural noise. In particular, the acoustic noise occurs when the natural resonance of the solid shaft 250 overlaps with the operating frequency of the motor.

The solid shaft 250 may be made of stainless steel, titanium, beryllium copper, or beryllium. The bending mode frequencies for each shaft material of a typical solid shaft may vary, as shown in Table 1 below.

TABLE 1

| | | | | | | | | | |
|---|---|---|---|---|---|---|---|---|---|
| Mode Comparison | | | | | | | | | |
| Shaft | Modulus | Density | Poisson's | Frequency (Hz) | | | | | |
| Material | (GPa) | (g/mm³) | Ratio | M1 | M2 | M3 | M4 | M5 | M6 |
| Stainless Steel | 221.0 | 0.00744 | 0.32 | 0.00* | 1179 | 1248** | 1249 | 2188 | 2238 |
| Titanium | 113.8 | 0.00443 | 0.34 | 0.00* | 916** | 965 | 1043 | 1962 | 2022 |
| Beryllium Copper | 127.6 | 0.00825 | 0.27 | 0.01* | 990** | 994 | 1066 | 1993 | 2048 |
| Beryllium | 289.6 | 0.00185 | 0.10 | 0.00* | 1296 | 1355** | 1523 | 2266 | 2307 |

Referring to Table 1 above, the unmarked frequencies indicate a shaft bending mode, the frequencies marked as * indicate a motor mode, and the frequencies marked as ** indicate a shaft torsion mode. In the examples described herein, a motor mode is a mode where the motor is operational and is rotating, a shaft bending mode is a mode where the shaft is bending, and a shaft torsion mode is a mode where the shaft is twisting.

As shown in Table 1 above and FIG. 2, when the shaft material of solid shaft 250 is stainless steel, Mode 1 (M1) is a motor mode, Mode 2 (M2), Mode 4 (M4), Mode 5 (M5), and Mode 6 (M6) are shaft bending modes, and Mode 3 (M3) is a shaft torsion mode. When the shaft material of solid shaft 250 is titanium, M1 is a motor mode, M2 is a shaft torsion mode, and M3, M4, M5, and M6 are shaft bending modes. When the shaft material of solid shaft 250 is beryllium copper, M1 is a motor mode, M2 is a shaft torsion mode, and M3, M4, M5, and M6 are shaft bending modes. When the shaft material of solid shaft 250 is beryllium, M1 is a motor mode, M3 is a shaft torsion mode, and M2, M4, M5, and M6 are shaft bending modes. As shown in Table 1 above, M2 and M3 generate both acoustic noise and structural noise.

In order to design a shaft that has a natural resonance that does not overlap with the operating frequency of the motor, the area moment of inertia (I) of the cross section of the shaft is determined using Equation 1 below:

$$I = \frac{\pi r^4}{4} \qquad \text{Equation 1}$$

where r is the radius of the shaft.

Once the area moment of inertia is determined, the stiffness of the shaft (k) may be determined using Equation 2 below:

$$k = \frac{3EI}{l^3} \qquad \text{Equation 2}$$

where E is the material elasticity (i.e., modulus of elasticity) of the shaft, I is the area moment of inertia of the shaft, and l is the length of the shaft.

Once the stiffness of the shaft is determined, the natural frequency ($\omega_n$) of the shaft may be determined using Equation 3 below:

$$\omega_n = \sqrt{\frac{k}{m}} = \sqrt{\frac{3EI}{ml^3}} \qquad \text{Equation 3}$$

where k is the stiffness of the shaft, m is the mass of the shaft, E is the material elasticity of the shaft, I is the area moment of the shaft, and l is the length of the shaft.

Figure 3:
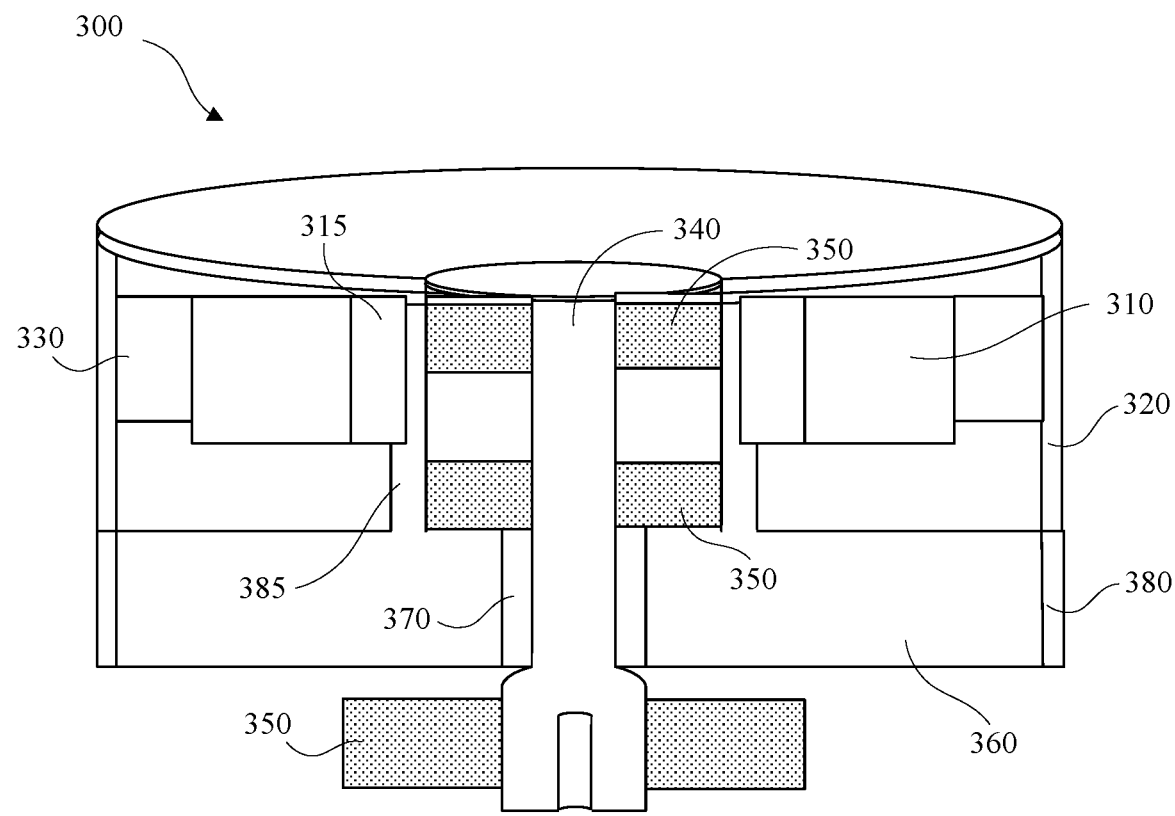
FIG. 3 is a cross-sectional diagram of an example of a motor configured for frequency isolation in accordance with embodiments of this disclosure.

FIG. 3 is a cross-sectional diagram of an example of a motor 300 configured for frequency isolation in accordance with embodiments of this disclosure. Referring to FIG. 3, the motor 300 includes a coil assembly 310. The coil assembly 310 includes one or more coils arranged in a circular structure. The one or more coils of the coil assembly 310 are attached to an inner ring 315 of the coil assembly 310. The motor 300 includes a ring 320 that surrounds an outer circumference of the coil assembly 310. One or more magnets 330 are adhered to an inner surface of the ring 320 such that they are adjacent to the coils of the coil assembly 310. In some examples, each of the magnets may corresponds with a respective coil of the coil assembly 310.

The motor 300 includes a shaft 340 that extends through a center portion of the circular structure of the coil assembly 310 and provides a rotational axis for the motor 300. The shaft 340 is configured to generate a natural resonance that does not overlap with an operating frequency of the motor 300. In some examples, the shaft 340 may have a narrow portion and a wide portion. The diameter of the narrow portion may be about 1 mm to about 4 mm, and the diameter of the wide portion may be about 3 mm to about 7 mm. In one example, the narrow portion may have a diameter of about 3 mm, and the wide portion may have a diameter of about 5 mm. In some examples, the wide portion, the narrow portion, or both, may be hollow. The example shown in FIG. 3 shows that the shaft 340 has a wide portion that is hollow.

In one example, the density of the material used to construct the shaft 340 may be adjusted to generate a natural resonance that does not overlap with an operating frequency of the motor 300. For example, based on the operating frequency of the motor 300, the shaft 340 may be a metal composition that includes steel, stainless steel, titanium, beryllium copper, beryllium, or any combination thereof. These materials are merely exemplary, and any material may be used depending on the operating frequency of the motor 300. In some examples, the natural resonance of the motor 300 may be adjusted such that the shaft 340 has a hollow construction. In an example where the shaft 340 is hollow, the shaft 340 may have a wall thickness of about 2 mm to about 4 mm. In some examples, the stiffness of the shaft 340 may be varied by adjusting the wall thickness such that the natural resonance does not overlap with the operational frequency of the motor 300. In some examples, the diameter of the shaft 340 may be increased to vary the stiffness of the shaft 340 such that the natural resonance does not overlap with the operational frequency of the motor 300. For example, the shaft 340 may have a diameter of about 10 mm to about 15 mm when the shaft 340 has a hollow construction.

The shaft 340 may be made of any material, for example, steel, stainless steel, titanium, beryllium copper, or beryllium. The bending mode frequencies for an example shaft material of steel shown in Table 2 below.

TABLE 2

| | | | Mode Comparison | | | | | |
|---|---|---|---|---|---|---|---|---|
| Shaft | Modulus | Density | Poisson's | Frequency (Hz) | | | | |
| Material | (GPa) | (g/mm$^3$) | Ratio | M1 | M2 | M3 | M4 | M5 | M6 |
| Steel | 196.5 | 0.00693 | 0.27 | 0.00* | 2125$^\Delta$ | 2127$^\Delta$ | 3635$^\Delta$ | 3669$^\Delta$ | 3669 |

Referring to Table 2 above, the unmarked frequencies indicate a shaft bending mode, the frequencies marked as * indicate a motor mode, and the frequencies marked as $^\Delta$ indicate a lower cage flexing mode. In this example, a lower cage flexing mode is a mode where the lower cage is changing shape or flexing. As shown in Table 2 above and FIG. 3, when the shaft material of shaft 340 is steel, Mode 1 (M1) is a motor mode, Mode 2 (M2), Mode 3 (M3), Mode 4 (M4), and Mode 5 (M5) are lower cage flexing modes, and Mode 6 (M6) is a shaft bending mode.

As shown in Table 2 above and FIG. 3, the lower modes, M2, M3, M4, and M5 of the steel shaft 340 are controlled by movement in the lower cage 360. In an example where the motor 300 is bolted to another component, additional stiffening may occur. In some examples, modification to the lower cage 360 may be incorporated to increase the stiffness of the lower cage 360 and raise the frequency of the modes. For example, the lower modes, M2, M3, M4, and M5 of the steel shaft 340 may shift higher. As shown in Table 2, the shaft bending mode for motor 300 occurs at a significantly higher frequency when compared to any of the typical motors shown in Table 1. In addition, shaft torsion mode did not occur at any frequency on the motor 300 as shown in Table 2.

Referring again to FIG. 3, the motor 300 includes one or more bearings 350 (shown in stippling). Each of the bearings 350 have a center portion through which the shaft 340 extends. The center portion of each of the bearings 350 is adhered to the shaft 340. Although any number of bearings may be used, the example shown in FIG. 3 includes three bearings, one of which is of a different size is shown merely as an example. If more than one bearing is present, each of the bearings 350 may be of different sizes, they may each be the same size, or they may each be substantially the same size. Increasing the number of bearings has an effect of increasing the stiffness of the shaft 340.

The motor 300 includes a lower cage 360 that is adhered to an outer portion of each of the bearings 350. The lower cage 360 includes an inner ring 370 and an outer ring 380. The inner ring 370 and the outer ring 380 of the lower cage 360 are connected via one or more radial arms (not shown). The inner ring 370 of the lower cage 360 includes a stalk portion 385. The stalk portion 385 is adhered to the outer portion of each of the bearings 350 and the inner ring 315 of the coil assembly 310. In an example where the bearings 350 are of different sizes, the stalk portion 385 may be staggered to accommodate the different diameters of the bearings 350.

A bottom portion of the lower cage 360 includes the inner ring 370, the outer ring 380, and the one or more radial arms. Each of the radial arms includes a bolt through hole. In some examples, the motor 300 may include one or more dampeners adhered to each of the radial arms of the lower cage 360 to reduce undesirable structural noise. Each of the dampeners may form a ring around each of the bolt through holes. Dampeners are not used with the bolt through holes of the lower cage in typical motors, such as motor 200, because they adversely affect the stiffness of the joint. Dampeners, however, may be used in configurations where the shaft 340 is adapted to generate a natural resonance that does not overlap with the operational frequency of the motor 300 in accordance with implementations of this disclosure. The dampening material may include, for example thermoplastic elastomers (TPE), thermoplastic polyurethanes (TPU) or silicone rubbers of various durometers, or a hard plastic such as polycarbonate. The dampening material may be varied based on the operational frequency of the motor 300, the natural resonance of the shaft 340, or both.

Figure 4:
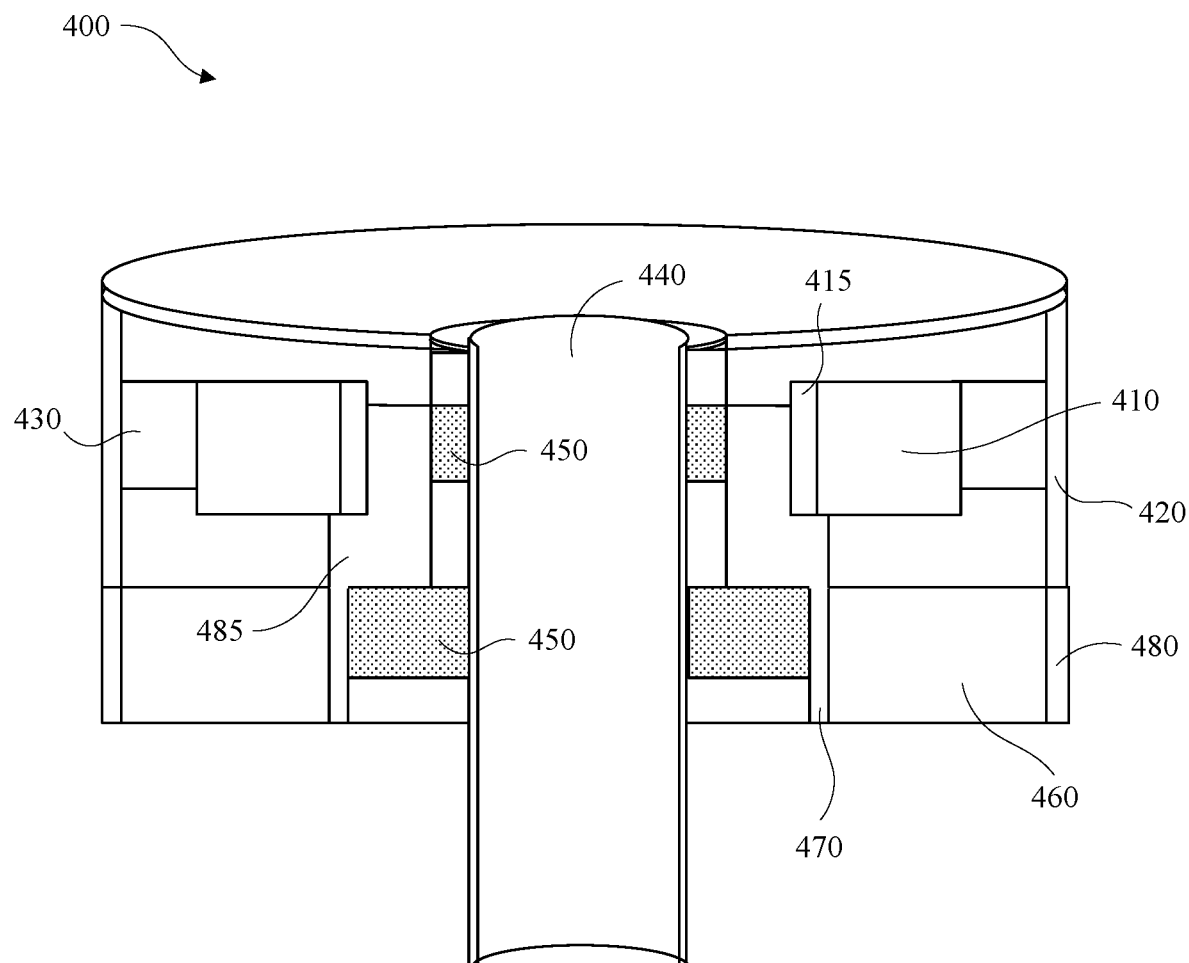
FIG. 4 is a cross-sectional diagram of another example of a motor configured for frequency isolation in accordance with embodiments of this disclosure.

FIG. 4 is a cross-sectional diagram of another example of a motor configured for frequency isolation in accordance with embodiments of this disclosure. Referring to FIG. 4, the motor 400 includes a coil assembly 410. The coil assembly 410 includes one or more coils arranged in a circular structure. The one or more coils of the coil assembly 410 are attached to an inner ring 415 of the coil assembly 410. The motor 400 includes a ring 420 that surrounds an outer circumference of the coil assembly 410. One or more magnets 430 are adhered to an inner surface of the ring 420 such that they are adjacent to the coils of the coil assembly 410. In some examples, each of the magnets may correspond with a respective coil of the coil assembly 410.

The motor 400 includes a shaft 440 that extends through a center portion of the circular structure of the coil assembly 410 and provides a rotational axis for the motor 400. The shaft 440 is configured to generate a natural resonance that does not overlap with an operating frequency of the motor 400.

In one example, the density of the material used to construct the shaft 440 may be adjusted to generate a natural resonance that does not overlap with an operating frequency of the motor 400. For example, based on the operating frequency of the motor 400, the shaft 440 may be a metal composition that includes steel, stainless steel, titanium, beryllium copper, beryllium, or any combination thereof. These materials are merely exemplary, and any material may be used depending on the operating frequency of the motor 400. In this example, the natural resonance of the motor 400 may be adjusted such that the shaft 440 has a hollow construction. In this example where the shaft 440 is hollow, the shaft 440 may have a wall thickness of about 2 mm to about 4 mm. In some examples, the stiffness of the shaft 440 may be varied by adjusting the wall thickness such that the natural resonance does not overlap with the operational frequency of the motor 400. In some examples, the diameter of the shaft 440 may be increased to vary the stiffness of the shaft 440 such that the natural resonance does not overlap with the operational frequency of the motor 400. For example, the shaft 440 may have a diameter of about 10 mm to about 15 mm.

The shaft 440 may be made of any material, for example, steel, stainless steel, titanium, beryllium copper, or beryllium. The bending mode frequencies for an example shaft material of steel shown in Table 2 above.

Referring to Table 2 above, the unmarked frequencies indicate a shaft bending mode, the frequencies marked as * indicate a motor mode, and the frequencies marked as Δ indicate a lower cage flexing mode. In this example, a lower cage flexing mode is a mode where the lower cage is changing shape or is flexing. As shown in Table 2 above and FIG. 3, when the shaft material of shaft 440 is steel, Mode 1 (M1) is a motor mode, Mode 2 (M2), Mode 3 (M3), Mode 4 (M4), and Mode 5 (M5) are lower cage flexing modes, and Mode 6 (M6) is a shaft bending mode.

As shown in Table 2 above and FIG. 4, the lower modes, M2, M3, M4, and M5 of the steel shaft 440 are controlled by movement in the lower cage 460. In an example where the motor 400 is bolted to another component, additional stiffening may occur. In some examples, modification to the lower cage 460 may be incorporated to increase the stiffness of the lower cage 460 and raise the frequency of the modes. For example, the lower modes, M2, M3, M4, and M5 of the steel shaft 440 may shift higher. As shown in Table 2, the shaft bending mode for motor 400 occurs at a significantly higher frequency when compared to any of the typical motors shown in Table 1. In addition, shaft torsion mode did not occur at any frequency on the motor 400 as shown in Table 2.

Referring again to FIG. 4, the motor 400 includes one or more bearings 450 (shown in stippling). Each of the bearings 450 have a center portion through which the shaft 440 extends. The center portion of each of the bearings 450 is adhered to the shaft 440. Although any number of bearings may be used, the example shown in FIG. 4 includes two bearings of different sizes are shown merely as an example. If more than one bearing is present, each of the bearings 450 may be of different sizes, they may each be the same size, or they may each be substantially the same size. Increasing the number of bearings increases the stiffness of the shaft 440.

The motor 400 includes a lower cage 460 that is adhered to an outer portion of each of the bearings 450. The lower cage 460 includes an inner ring 470 and an outer ring 480. The inner ring 470 and the outer ring 480 of the lower cage 460 are connected via one or more radial arms (not shown). The inner ring 470 of the lower cage 460 includes a stalk portion 485. The stalk portion 485 is adhered to the outer portion of each of the bearings 450 and the inner ring 415 of the coil assembly 410. In an example where the bearings 450 are of different sizes, the stalk portion 485 may be staggered to accommodate the different diameters of the bearings 450.

A bottom portion of the lower cage 460 includes the inner ring 470, the outer ring 480, and the one or more radial arms. Each of the radial arms includes a bolt through hole. In some examples, the motor 400 may include one or more dampeners adhered to each of the radial arms of the lower cage 460 to reduce undesirable structural noise. Each of the dampeners may form a ring around each of the bolt through holes. Dampeners are not used with the bolt through holes of the lower cage in typical motors, such as motor 200, because they adversely affect the stiffness of the joint. Dampeners, however, may be used in configurations where the shaft 440 is adapted to generate a natural resonance that does not overlap with the operational frequency of the motor 400 in accordance with implementations of this disclosure. The dampening material may include, for example TPE, TPU or silicone rubbers of various durometers, or a hard plastic such as polycarbonate. The dampening material may be varied based on the operational frequency of the motor 400, the natural resonance of the shaft 440, or both.

Figure 5:
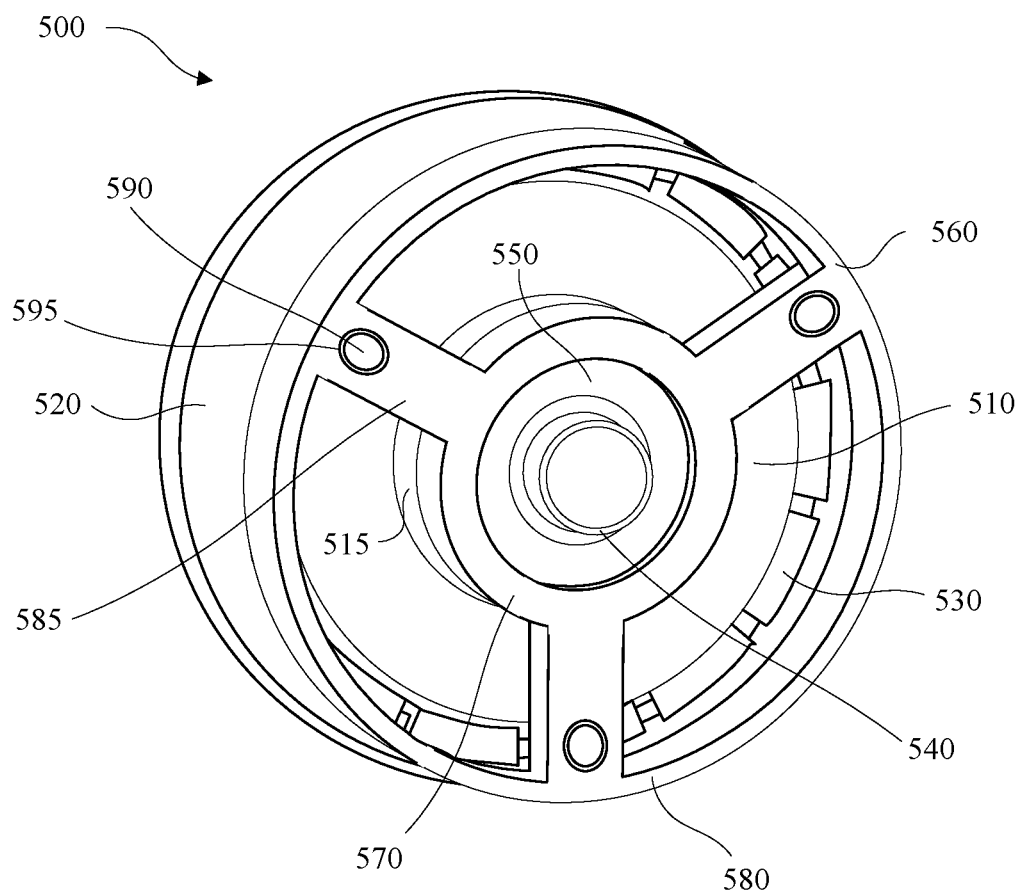
FIG. 5 is a diagram of an example bottom-view of a motor configured to reduce structural noise in accordance with embodiments of this disclosure.

FIG. 5 is a diagram of an example bottom-view of a motor 500 configured to reduce structural noise in accordance with embodiments of this disclosure. The motor 500 includes a coil assembly 510. The coil assembly 510 includes one or more coils arranged in a circular structure. The one or more coils of the coil assembly 510 are attached to an inner ring 515 of the coil assembly 510. The motor 500 includes a ring 520 that surrounds an outer circumference of the coil assembly 510. One or more magnets 530 are adhered to an inner surface of the ring 520 such that they are adjacent to the coils of the coil assembly 510. In some examples, each of the magnets may correspond with a respective coil of the coil assembly 510. The motor 500 includes a shaft 540 that is configured to reduce structural noise, acoustic noise, or both, caused by a torsion mode of the shaft 540. The shaft 540 is configured to generate a natural resonance that does not overlap with an operating frequency of the motor to reduce structural noise and acoustic noise caused by the torsion mode of the shaft 540.

As shown in FIG. 5, the natural resonance of the motor 500 may be adjusted such that the shaft 540 has a hollow construction. In some examples, the shaft 540 may have a narrow portion and a wide portion. The diameter of the narrow portion may be about 1 mm to about 4 mm, and the diameter of the wide portion may be about 3 mm to about 7 mm. In one example, the narrow portion may have a diameter of about 3 mm, and the wide portion may have a diameter of about 5 mm. In some examples, the wide portion, the narrow portion, or both, may be hollow. The example shown in FIG. 5 shows that the shaft 540 has a hollow construction.

In one example, the density of the material used to construct the shaft 540 may be adjusted to generate a natural resonance that does not overlap with an operating frequency of the motor 500. For example, based on the operating frequency of the motor 500, the shaft 540 may be a metal composition that includes steel, stainless steel, titanium, beryllium copper, beryllium, or any combination thereof. These materials are merely exemplary, and any material may be used depending on the operating frequency of the motor 500. In an example where the shaft 540 is hollow, the shaft 540 may have a wall thickness of about 8 mm to about 12 mm. In some examples, the stiffness of the shaft 540 may be varied by adjusting the wall thickness such that the natural resonance does not overlap with the operational frequency of the motor 500. In some examples, the diameter of the shaft 540 may be increased to vary the stiffness of the shaft 540 such that the natural resonance does not overlap with the operational frequency of the motor 500. For example, the shaft 540 may have a diameter of about 10 mm to about 15 mm and a wall thickness of about 2 mm to about 4 mm when the shaft 540 has a hollow construction. When the shaft 540 has a solid construction, the diameter of the shaft 540 may be from about 8 mm to about 12 mm.

Referring again to FIG. 5, the motor 500 includes one or more bearings 550. Each of the bearings 550 have a center portion through which the shaft 540 extends. The center portion of each of the bearings 550 is adhered to the shaft 540. Any number of bearings may be used, and if more than one bearing is present, each of the bearings 550 may be of different sizes, they may each be the same size, or they may each be substantially the same size.

The motor 500 includes a lower cage 560 that is adhered to an outer portion of each of the bearings 550. The lower cage 560 includes an inner ring 570 and an outer ring 580. The inner ring 570 and the outer ring 580 of the lower cage 560 are connected via one or more radial arms 585. The inner ring 570 of the lower cage 560 includes a stalk portion (not shown). The stalk portion is adhered to the outer portion of each of the bearings 550 and the inner ring 515 of the coil assembly 510. In an example where the bearings 550 are of different sizes, the stalk portion may be staggered to accommodate the different diameters of the bearings 550.

A bottom portion of the lower cage 560 includes the inner ring 570, the outer ring 580, and the one or more radial arms 585. Each of the radial arms 585 includes a bolt through hole 590. In some examples, the motor 500 may include one or more dampeners 595 adhered to each of the radial arms 585 of the lower cage 560 to reduce undesirable structural noise. Each of the dampeners 595 may form a ring around each of the bolt through holes 590. Dampeners are not used with the bolt through holes of the lower cage in typical motors, such as motor 200, because they adversely affect the stiffness of the joint. Dampeners, however, may be used in configurations where the shaft 540 is adapted to generate a natural resonance that does not overlap with the operational frequency of the motor 500 in accordance with implementations of this disclosure. The dampening material may include, for example TPE, TPU or silicone rubbers of various durometers, or a hard plastic such as polycarbonate. The dampening material may be varied based on the operational frequency of the motor 500, the natural resonance of the shaft 540, or both.

Figure 6:
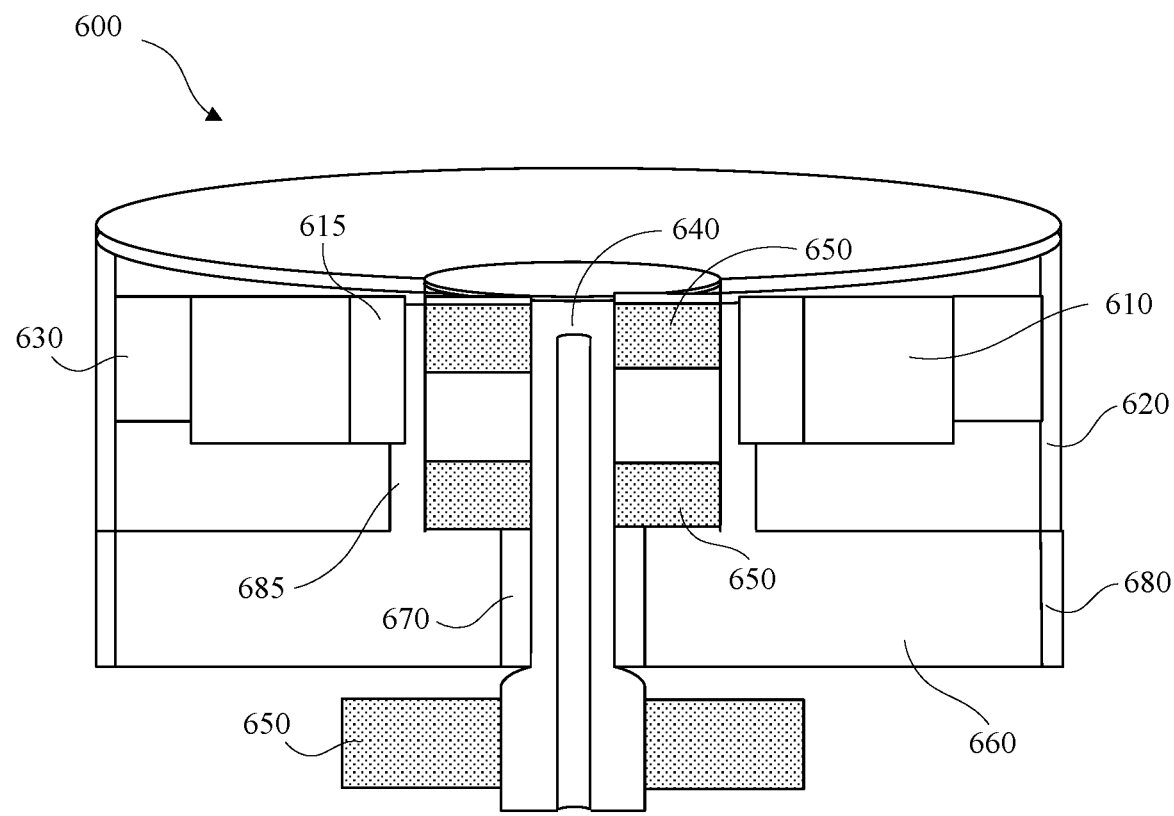
FIG. 6 is a cross-sectional diagram of another example of a motor configured for frequency isolation in accordance with embodiments of this disclosure.

FIG. 6 is a cross-sectional diagram of another example of a motor 600 configured for frequency isolation in accordance with embodiments of this disclosure. Referring to FIG. 6, the motor 600 includes a coil assembly 610. The coil assembly 610 includes one or more coils arranged in a circular structure. The one or more coils of the coil assembly 610 are attached to an inner ring 615 of the coil assembly 610. The motor 600 includes a ring 620 that surrounds an outer circumference of the coil assembly 610. One or more magnets 630 are adhered to an inner surface of the ring 620 such that they are adjacent to the coils of the coil assembly 610. In some examples, each of the magnets may corresponds with a respective coil of the coil assembly 610.

The motor 600 includes a shaft 640 that extends through a center portion of the circular structure of the coil assembly 610 and provides a rotational axis for the motor 600. The shaft 640 is configured to generate a natural resonance that does not overlap with an operating frequency of the motor 600. In some examples, the shaft 640 may have a narrow portion and a wide portion. The diameter of the narrow portion may be about 1 mm to about 4 mm, and the diameter of the wide portion may be about 3 mm to about 7 mm. In one example, the narrow portion may have a diameter of about 3 mm, and the wide portion may have a diameter of about 5 mm. In some examples, the wide portion, the narrow portion, or both, may be hollow. The example shown in FIG. 6 shows that the shaft 640 has a narrow portion and wide portion, both of which have a hollow construction.

In one example, the density of the material used to construct the shaft 640 may be adjusted to generate a natural resonance that does not overlap with an operating frequency of the motor 600. For example, based on the operating frequency of the motor 600, the shaft 640 may be a metal composition that includes steel, stainless steel, titanium, beryllium copper, beryllium, or any combination thereof. These materials are merely exemplary, and any material may be used depending on the operating frequency of the motor 600. In some examples, the natural resonance of the motor 300 may be adjusted such that the shaft 640 has a hollow construction. In an example where the shaft 640 is hollow, the shaft 640 may have a wall thickness of about 2 mm to about 4 mm. In some examples, the stiffness of the shaft 640 may be varied by adjusting the wall thickness such that the natural resonance does not overlap with the operational frequency of the motor 600. In some examples, the diameter of the shaft 640 may be increased to vary the stiffness of the shaft 640 such that the natural resonance does not overlap with the operational frequency of the motor 600. For example, the shaft 640 may have a diameter of about 10 mm to about 15 mm when the shaft 640 has a hollow construction.

The shaft 640 may be made of any material, for example, steel, stainless steel, titanium, beryllium copper, or beryllium. The bending mode frequencies for an example shaft material of steel shown in Table 2 above.

Referring to Table 2 above, the unmarked frequencies indicate a shaft bending mode, the frequencies marked as * indicate a motor mode, and the frequencies marked as ^ indicate a lower cage flexing mode. In this example, a lower cage flexing mode is a mode where the lower cage is changing shape or is flexing. As shown in Table 2 above and FIG. 6, when the shaft material of shaft 640 is steel, Mode 1 (M1) is a motor mode, Mode 2 (M2), Mode 3 (M3), Mode 4 (M4), and Mode 5 (M5) are lower cage flexing modes, and Mode 6 (M6) is a shaft bending mode.

As shown in Table 2 above and FIG. 6, the lower modes, M2, M3, M4, and M5 of the steel shaft 640 are controlled by movement in the lower cage 660. In an example where the motor 600 is bolted to another component, additional stiffening may occur. In some examples, modification to the lower cage 660 may be incorporated to increase the stiffness of the lower cage 660 and raise the frequency of the modes.

For example, the lower modes, M2, M3, M4, and M5 of the steel shaft 640 may shift higher. As shown in Table 2, the shaft bending mode for motor 300 occurs at a significantly higher frequency when compared to any of the typical motors shown in Table 1. In addition, shaft torsion mode did not occur at any frequency on the motor 600 as shown in Table 2.

Referring again to FIG. 6, the motor 600 includes one or more bearings 650 (shown in stippling). Each of the bearings 650 have a center portion through which the shaft 640 extends. The center portion of each of the bearings 650 is adhered to the shaft 640. Although any number of bearings may be used, the example shown in FIG. 6 includes three bearings, one of which is of a different size and is shown merely as an example. If more than one bearing is present, each of the bearings 650 may be of different sizes, they may each be the same size, or they may each be substantially the same size. Increasing the number of bearings has an effect of increasing the stiffness of the shaft 640.

The motor 600 includes a lower cage 660 that is adhered to an outer portion of each of the bearings 650. The lower cage 660 includes an inner ring 670 and an outer ring 680. The inner ring 670 and the outer ring 680 of the lower cage 660 are connected via one or more radial arms (not shown). The inner ring 670 of the lower cage 660 includes a stalk portion 685. The stalk portion 685 is adhered to the outer portion of each of the bearings 650 and the inner ring 615 of the coil assembly 610. In an example where the bearings 650 are of different sizes, the stalk portion 685 may be staggered to accommodate the different diameters of the bearings 650.

A bottom portion of the lower cage 660 includes the inner ring 670, the outer ring 680, and the one or more radial arms. Each of the radial arms includes a bolt through hole. In some examples, the motor 600 may include one or more dampeners adhered to each of the radial arms of the lower cage 660 to reduce undesirable structural noise. Each of the dampeners may form a ring around each of the bolt through holes. Dampeners are not used with the bolt through holes of the lower cage in typical motors, such as motor 200, because they adversely affect the stiffness of the joint. Dampeners, however, may be used in configurations where the shaft 640 is adapted to generate a natural resonance that does not overlap with the operational frequency of the motor 600 in accordance with implementations of this disclosure. The dampening material may include, for example TPE, TPU or silicone rubbers of various durometers, or a hard plastic such as polycarbonate. The dampening material may be varied based on the operational frequency of the motor 600, the natural resonance of the shaft 640, or both.

Figure 7:
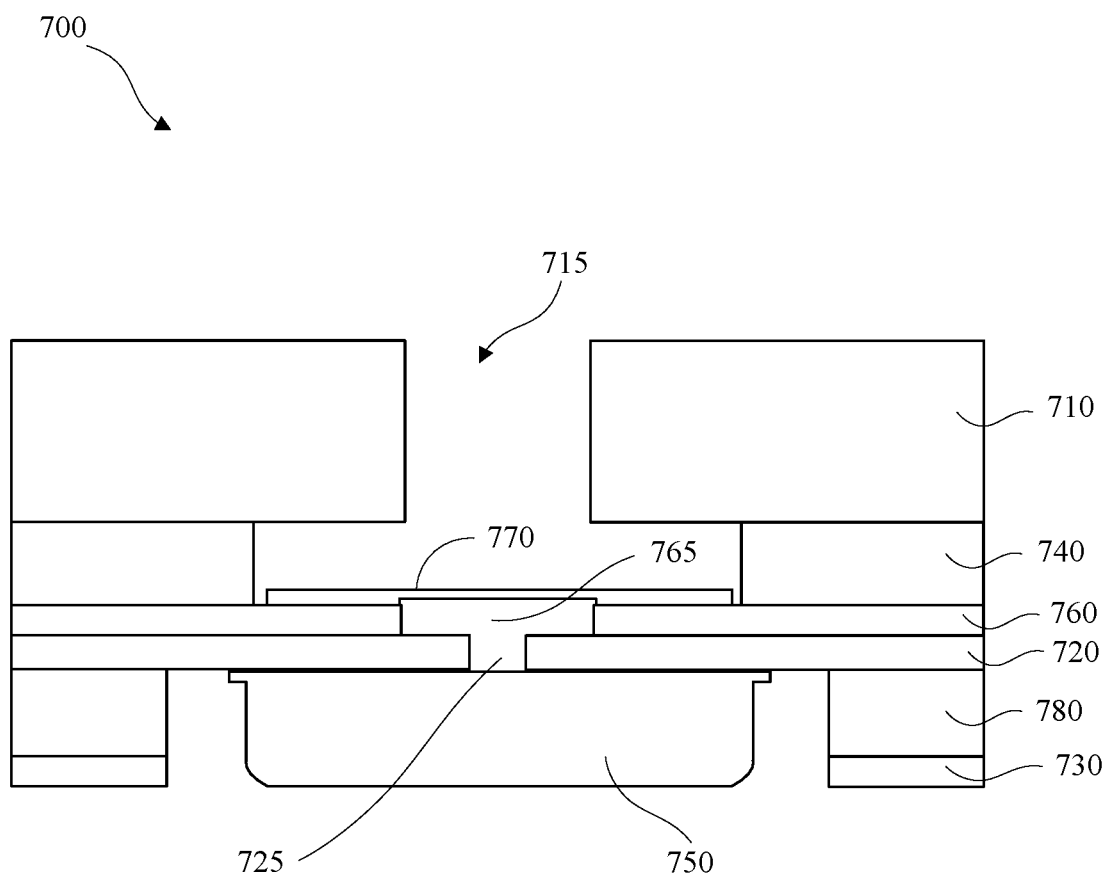
FIG. 7 is a cross-sectional diagram of an example of a microphone assembly in accordance with embodiments of this disclosure.

FIG. 7 is a cross-sectional diagram of an example of a microphone assembly 700 in accordance with embodiments of this disclosure. As shown in FIG. 7, the microphone assembly 700 includes a device housing 710, a flexible printed circuit board (PCB) 720, a bracket 730, a dampener 740, and a microphone 750. In some examples, a gasket 780 may be positioned between the flexible PCB 720 and the bracket 730. The device housing 710 may be a housing, or a portion thereof, of any device to which the microphone assembly 700 is attached. Example device include, and are not limited to, image capture devices, image stabilization devices, UAVs, or a combination thereof.

The device housing 710 includes a port 715 to allow the transmission of audio waves to travel to the microphone 750. The flexible PCB 720 includes a port 725 to allow the transmission of audio waves to travel to the microphone 750. The stiffener 760 includes a port 765 to allow the transmission of audio waves to travel to the microphone 750. In some examples, a mesh 770 may attached to the flexible PCB 720 to cover the port 725. The mesh 770 may be a mesh material or a membrane material. For example, the mesh material may be a polyester monofilament. The mesh material may have an acoustic resistance below 700 Rayls. It would be desirable to have a mesh material that is stiff, for which the transmission of sound is primarily through the pores of the mesh material. For example, the mesh material may have a stiffness of above $1 \times 10^6$ N/m. The membrane material may be a silicone material, a polyester monofilament, a polytetrafluoroethylene (PTFE) material, or any suitable material. It would be desirable to have a membrane material that has elasticity. For example, the membrane material may have a stiffness of 10 to 50 N/m. The membrane material may be air permeable or non-air permeable.

The dampener 740 is coupled to the device housing 710 and the flexible PCB 720. In some examples, the dampener 740 is coupled to the flexible PCB 720 via a stiffener 760, tape, or a combination thereof. In this example, a stiffness of the dampener 740 is based on a modal analysis of a motor and a resonance of a motor shaft. The dampener 740 may be constructed of, for example TPE, TPU or silicone rubbers of various durometers, or a hard plastic such as polycarbonate. The material used for the dampener 740 may be varied based on the operational frequency of a motor, the natural resonance of the motor shaft, or both. In an example where the resonance of the motor shaft is a low frequency, a dampener with a low stiffness may be used to reduce undesirable structural noise. In an example where the resonance of the motor shaft is a high frequency, a dampener with a high stiffness may be used to reduce undesirable structural noise.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Plural elements, components or steps can be provided by a single integrated element, component or step. Alternatively, a single integrated element, component or step might be divided into separate plural elements, components or steps. The disclosure of "a" or "one" to describe an element, component or step is not intended to foreclose additional elements, components or steps.

It is understood that the above description is intended to be illustrative and not restrictive. Many embodiments as well as many applications besides the examples provided will be apparent to those of skill in the art upon reading the above description. The omission in the following claims of any aspect of subject matter that is disclosed herein is not a disclaimer of such subject matter, nor should it be regarded that the inventors did not consider such subject matter to be part of the disclosed inventive subject matter.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A handheld image stabilization device comprising:
   a housing comprising a first port;
   a motor assembly attached to the housing, the motor assembly comprising a plurality of motors;

a microphone configured to detect audio waves via the first port, wherein the audio waves include acoustic noise from the plurality of motors;
a dampener disposed between the housing and the microphone at a location of the first port, wherein the dampener is configured to reduce the acoustic noise from the plurality of motors; and
a frame that comprises:
  a first portion connected to a first motor of the plurality of motors,
  a second portion connected to a second motor of the plurality of motors, and
  a third portion connected to a third motor of the plurality of motors.

2. The handheld image stabilization device of claim 1, wherein a stiffness of the dampener is based on a resonance of the plurality of motors.

3. The handheld image stabilization device of claim 2, wherein the stiffness of the dampener is decreased as the resonance of the plurality of motors decreases.

4. The handheld image stabilization device of claim 2, wherein the stiffness of the dampener is increased as the resonance of the plurality of motors increases.

5. The handheld image stabilization device of claim 1, wherein the dampener comprises a second port aligned with the first port to allow the audio waves to travel to the microphone.

6. The handheld image stabilization device of claim 1, wherein the first portion, the second portion, and the third portion are sequentially connected to provide a three-axis rotation.

7. A handheld image stabilization device comprising:
a housing comprising a first port;
a motor assembly attached to the housing, the motor assembly comprising a plurality of motors;
a microphone configured to detect vibration noise from the plurality of motors via the housing;
a dampener disposed between the housing and the microphone at a location of the first port, wherein the dampener comprises a silicon rubber component that is configured to reduce the vibration noise from the plurality of motors; and
a frame that comprises:
  a first portion connected to a first motor of the plurality of motors,
  a second portion connected to a second motor of the plurality of motors, and
  a third portion connected to a third motor of the plurality of motors.

8. The handheld image stabilization device of claim 7, wherein a stiffness of the dampener is based on a resonance of the plurality of motors.

9. The handheld image stabilization device of claim 8, wherein the stiffness of the dampener is decreased as the resonance of the plurality of motors decreases.

10. The handheld image stabilization device of claim 8, wherein the stiffness of the dampener is increased as the resonance of the plurality of increases.

11. The handheld image stabilization device of claim 7, wherein the dampener comprises a second port aligned with the first port to allow audio waves to travel to the microphone.

12. The handheld image stabilization device of claim 7, wherein the first portion, the second portion, and the third portion are sequentially connected to provide a three-axis rotation.

13. An image capture device comprising:
an image sensor;
an image stabilization device coupled to the image sensor, the image stabilization device comprising a motor assembly, the motor assembly comprising a plurality of motors;
a microphone configured to detect acoustic noise and vibration noise from the plurality of motors;
a dampener configured to reduce the acoustic noise and the vibration noise from the plurality of motors; and
a frame that comprises:
  a first portion connected to a first motor of the plurality of motors,
  a second portion connected to a second motor of the plurality of motors, and
  a third portion connected to a third motor of the plurality of motors.

14. The image capture device of claim 13, wherein a stiffness of the dampener is based on a resonance of the plurality of motors.

15. The image capture device of claim 13, wherein the dampener comprises a silicon rubber component, a thermoplastic polyurethane (TPU) component, a thermoplastic elastomer (TPE) component, or a polycarbonate component.

16. The image capture device of claim 13, wherein the dampener comprises a port to allow audio waves to travel to the microphone.

17. The image capture device of claim 13, wherein the first portion, the second portion, and the third portion are sequentially connected to provide a three-axis rotation and control of the image sensor.

* * * * *